US010628996B2

(12) United States Patent
Kass

(10) Patent No.: US 10,628,996 B2
(45) Date of Patent: Apr. 21, 2020

(54) DIRECT LIGHT COMPENSATION TECHNIQUE FOR AUGMENTED REALITY SYSTEM

(71) Applicant: MAGIC LEAP, INC., Plantation, FL (US)

(72) Inventor: Michael Kass, Cupertino, CA (US)

(73) Assignee: Magic Leap, Inc., Plantation, FL (US)

(*) Notice: Subject to any disclaimer, the term of this patent is extended or adjusted under 35 U.S.C. 154(b) by 0 days.

(21) Appl. No.: 15/460,009

(22) Filed: Mar. 15, 2017

(65) Prior Publication Data

US 2017/0270707 A1 Sep. 21, 2017

Related U.S. Application Data

(60) Provisional application No. 62/308,433, filed on Mar. 15, 2016.

(51) Int. Cl.
| | | |
|---|---|---|
| *G06T 15/50* | (2011.01) | |
| *G06T 11/00* | (2006.01) | |
| *G06T 19/00* | (2011.01) | |
| *G06T 19/20* | (2011.01) | |

(52) U.S. Cl.
CPC .......... *G06T 15/506* (2013.01); *G06T 11/001* (2013.01); *G06T 19/006* (2013.01); *G06T 19/20* (2013.01); *G06T 2215/16* (2013.01); *G06T 2219/2012* (2013.01)

(58) Field of Classification Search
None
See application file for complete search history.

(56) References Cited

U.S. PATENT DOCUMENTS

| | | | |
|---|---|---|---|
| 2010/0195112 A1 | 8/2010 | Davidson | |
| 2013/0063486 A1 | 3/2013 | Braun et al. | |
| 2013/0208014 A1* | 8/2013 | Fleck | G06K 9/00684 345/672 |
| 2013/0328925 A1* | 12/2013 | Latta | G09G 3/003 345/633 |

(Continued)

OTHER PUBLICATIONS

International Search Report and Written Opinion, dated May 25, 2017, for PCT/US17/22578, Applicant Magic Leap, Inc., International filing date of Mar. 15, 2017, 9 pages.

(Continued)

*Primary Examiner* — Tize Ma
(74) *Attorney, Agent, or Firm* — Vista IP Law Group LLP

(57) ABSTRACT

An augmented reality system and method of operating the same is provided. An end user is allowed to visualize direct light from a three-dimensional scene in an ambient environment, generating virtual image data from the point of the view of the end user. A region of spatial overlap between a real object in the three-dimensional scene and a virtual object in the virtual image data is determined. Color characteristics of the real object in the overlap region are determined. A perceived contrast between the real object and the virtual object in the overlap region is decreased based on the determined color characteristics of the real object in the overlap region. The virtual image data is displayed as a virtual image after the perceived contrast between the real object and the virtual object has been decreased that, along with the visualized direct light, creates a three-dimensional augmented scene.

17 Claims, 11 Drawing Sheets

(56) References Cited

U.S. PATENT DOCUMENTS

2013/0335404 A1 12/2013 Westerinen et al.
2017/0038593 A1* 2/2017 Travers .................. G02B 27/01
2017/0351328 A1* 12/2017 Perrin ..................... G06F 3/013

OTHER PUBLICATIONS

Extended European Search Report for EP Application No. 17767470.2 dated Jan. 9, 2019.
K. Kiyokawa et al., "An optical see-through display for mutual occlusion with a real-time sterovision system", Computers and Graphics, Elsevier, GB, vol. 25, No. 5, Oct. 2001, pp. 765-779, XP4318022.
Weiland, Christian et al., "Colorimetric and Photometric Compensation for Optical See-Through Displays", Jul. 19, 2009, International Conference on Simulation, Modeling, and Programming for Autonomous Robots, SIMPAR 2010;pp. 603-612, XP47388856.
Kaori Murase et al., "Correct Occlusion Effect in the Optical See-through Immersive Augmented Reality Display System", 18th International Conference on Artificial Reality and Telexistence, Dec. 1, 2008, pp. 12-19, XP55537853.
EP Office Action Response to Extended European Search Report for EP Patent Appln. No. 17767470.2 dated Jul. 31, 2019.

\* cited by examiner

DIRECT LIGHT COMPENSATION TECHNIQUE FOR AUGMENTED REALITY SYSTEM

CROSS-REFERENCE TO RELATED APPLICATION(S)

This application claims priority from U.S. Provisional Patent Application Ser. No. 62/308,433, entitled "DIRECT LIGHT COMPENSATION TECHNIQUE FOR AUGMENTED REALITY SYSTEM," filed on Mar. 15, 2016. The content of the aforementioned patent application is hereby expressly incorporated by reference in its entirety.

FIELD OF THE INVENTION

The present invention generally relates to systems and methods configured to facilitate interactive augmented reality environments for one or more users.

BACKGROUND

Modern computing and display technologies have facilitated the development of systems for so-called "virtual reality" or "augmented reality" experiences, wherein digitally reproduced images or portions thereof are presented to a user in a manner where they seem to be, or may be perceived as, real. A virtual reality (VR) scenario typically involves presentation of digital or virtual image information without transparency to other actual real-world visual input, whereas an augmented reality (AR) scenario typically involves presentation of digital or virtual image information as an augmentation to visualization of the actual world around the user.

For example, referring to FIG. 1, an augmented reality scene 2 is depicted wherein a user of AR technology sees a real-world park-like setting 4 featuring people 6, trees 8, buildings 10, and sky 12 in the background, and a concrete platform 14. In addition to these items, the user of the AR technology also perceives that he "sees" a robot 16 standing upon the real-world platform 14, and a cartoon-like avatar character 18 flying by which seems to be a personification of a bumble bee, even though these elements 16, 18 do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

VR and AR display systems can benefit from information regarding the head pose of a viewer or user (i.e., the orientation and/or location of user's head).

For instance, head-worn displays (or helmet-mounted displays, or smart glasses) are at least loosely coupled to a user's head, and thus move when the user's head moves. If the user's head motions are detected by the display system, the data being displayed can be updated to take the change in head pose into account.

As an example, if a user wearing a head-worn display views a virtual representation of a three-dimensional (3D) object on the display and walks around the area where the 3D object appears, that 3D object can be re-rendered for each viewpoint, giving the user the perception that he or she is walking around an object that occupies real space. If the head-worn display is used to present multiple objects within a virtual space (for instance, a rich virtual world), measurements of head pose can be used to re-render the scene to match the user's dynamically changing head location and orientation and provide an increased sense of immersion in the virtual space.

Head-worn displays that enable AR (i.e., the concurrent viewing of real and virtual elements) can have several different types of configurations. In one such configuration, often referred to as a "video see-through" display, a camera captures elements of a real scene, a computing system superimposes virtual elements onto the captured real scene, and a non-transparent display presents the composite image to the eyes. Another configuration is often referred to as an "optical see-through" display, in which the user can see through transparent (or semi-transparent) elements in the display system to view directly the light from real objects in the environment. The transparent element, often referred to as a "combiner," superimposes light from the display over the user's view of the real world.

Most pertinent to the present inventions is the optical see-through AR display, which allows the user to directly view ambient light from the real-world environment. In general, it is desirable that the virtual objects that are superimposed over the real world be opaque, so that real objects or portions thereof behind the virtual objects from the user's perspective are completely obscured to provide a real world experience to the user. However, because the light from the real world is combined with the light from the virtual world, as opposed to being blocked by the virtual world, the virtual objects or portions thereof may appear transparent or translucent when overlapping real objects.

There, thus, is a need to ensure that virtual objects displayed to a user in optical see-through AR system are as opaque as possible.

SUMMARY

In accordance with a first aspect of the present inventions, a method of operating an augmented reality (AR) system is provided. The method comprises allowing an end user to visualize direct light from a three-dimensional scene in an ambient environment, generating virtual image data from the point of the view of the end user, determining a region of spatial overlap between a real object in the three-dimensional scene and a virtual object in the virtual image data, and color characteristics of the real object in the overlap region. The method further comprises decreasing a perceived contrast (e.g., a perceived color contrast and/or perceived color intensity) between the real object and the virtual object in the overlap region based on the determined color characteristics of the real object in the overlap region. The method further comprises displaying the virtual image data as a virtual image to the end user after the perceived contrast between the real object and the virtual object has been decreased that, along with the visualized direct light, creates a three-dimensional augmented scene.

In one method, decreasing the perceived contrast between the real object and the virtual object comprises generating interference data based on the determined color characteristics of the real object in the overlap region, and displaying the interference data as an interference image over the overlap region to the end user, such that the interference image combines with the direct light from the real object (e.g., by adding color) to create a background for the virtual object in the overlap region. The background in the overlap region may have a decreased dynamic color range relative to the real object in the overlap region. For example, the background may have a generally uniform color (e.g., grey) in the overlap region.

In another method, decreasing the contrast between the real object and the virtual object comprises modifying the virtual image data (e.g., by subtracting color from the virtual object) based on the determined color characteristics of the real object in the overlap region.

Still another method further comprises capturing image data of the real three-dimensional scene with at least one camera affixed relative to the user's head, and warping the captured image data to the point of view of the user. In this case, determining the overlap region between the real object and the virtual object comprises determining a spatial overlap between a corresponding real object in the warped image data and the virtual object in the virtual image data, and determining the color characteristics of the real object in the overlap region comprises determining color characteristics of the corresponding real object in the warped image data in the overlap region. Each of the warped image data and the virtual image data comprises a plurality of pixels, each of which is defined by at least one value, in which case, decreasing the contrast between the real object and the virtual object may comprise modifying the value(s) of a pixel of one or both of the virtual object and interference data derived from the warped image data in the overlap region. Each of the pixels may comprise three values defining a color vector (e.g., red, green, and blue values), and may further have a fourth value defining an intensity of the pixel.

In accordance with another aspect of the present inventions, an augmented reality (AR) system comprises a display system configured for allowing an end user to visualize direct light from a three-dimensional scene in an ambient environment. In one embodiment, the display system is configured for being positioned in front of the eyes of the end user. The augmented reality system may further comprise a frame structure carrying the display system and configured for being worn by the end user. The display system may include a projection subsystem and a partially transparent display surface, the projection subsystem configured for projecting a virtual image onto the partially transparent display surface. In this case, the partially transparent display surface is configured for being position in the field of view between the eyes of the end user and the ambient environment.

The augmented reality system further comprises a control system (e.g., one comprising a graphical processing unit (GPU)) configured for generating virtual image data from the point of the view of the end user, determining a region of spatial overlap between a real object in the three-dimensional scene and a virtual object in the virtual image data, determining color characteristics of the real object in the overlap region, and decreasing a perceived contrast between the real object and the virtual object in the overlap region based on the determined color characteristics of the real object in the overlap region; for example by modifying a perceived color contrast between the real object and the virtual object in the overlap region and/or modifying a perceived intensity contrast between the real object and the virtual object in the overlap region. The control system is further configured for instructing the display system to display the virtual image data as a virtual image to the end user after the perceived contrast between the real object and the virtual object has been decreased that, along with the visualized direct light, creates a three-dimensional augmented scene.

In one embodiment, the control system is configured for decreasing the perceived contrast between the real object and the virtual object by generating interference data based on the determined color characteristics of the real object in the overlap region, and instructing the display system to display the interference data as an interference image over the overlap region to the end user, such that the interference image combines with the direct light from the real object (e.g., by adding color) to create a background for the virtual object in the overlap region. The background in the overlap region may have a decreased dynamic color range relative to the real object in the overlap region. For example, the background may have a generally uniform color (e.g., grey) in the overlap region.

In another embodiment, the control system is configured for decreasing the contrast between the real object and the virtual object by modifying the virtual image data (e.g., by subtracting color from the virtual object) based on the determined color characteristics of the real object in the overlap region.

In still another embodiment, the augmented reality system further comprising at least one camera configured for being affixed relative to the user's head, and further configured for capturing image data of the real three-dimensional scene, wherein the control system is configured for warping the captured image data to the point of view of the user. In this case, the control system is configured for determining the overlap region between the real object and the virtual object by determining a spatial overlap between a corresponding real object in the captured image data and the virtual object in the virtual image data, and determining the color characteristics of the real object in the overlap region comprises determining color characteristics of the corresponding real object in the warped image data in the overlap region.

Each of the captured image data and the virtual image data comprises a plurality of pixels, each of which is defined by at least one value, in which case, the control system is configured for decreasing the contrast between the real object and the virtual object by modifying the value(s) of a pixel of one or both of the virtual object and interference data derived from the warped image data in the overlap region. Each of the pixels may comprise three values defining a color vector (e.g., red, green, and blue values), and may further have a fourth value defining an intensity of the pixel.

Additional and other objects, features, and advantages of the invention are described in the detail description, figures and claims.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

The description that follows relates to display systems and methods to be used in augmented reality systems. However, it is to be understood that the while the invention lends itself well to applications in virtual reality, the invention, in its broadest aspects, may not be so limited.

Figure 2:
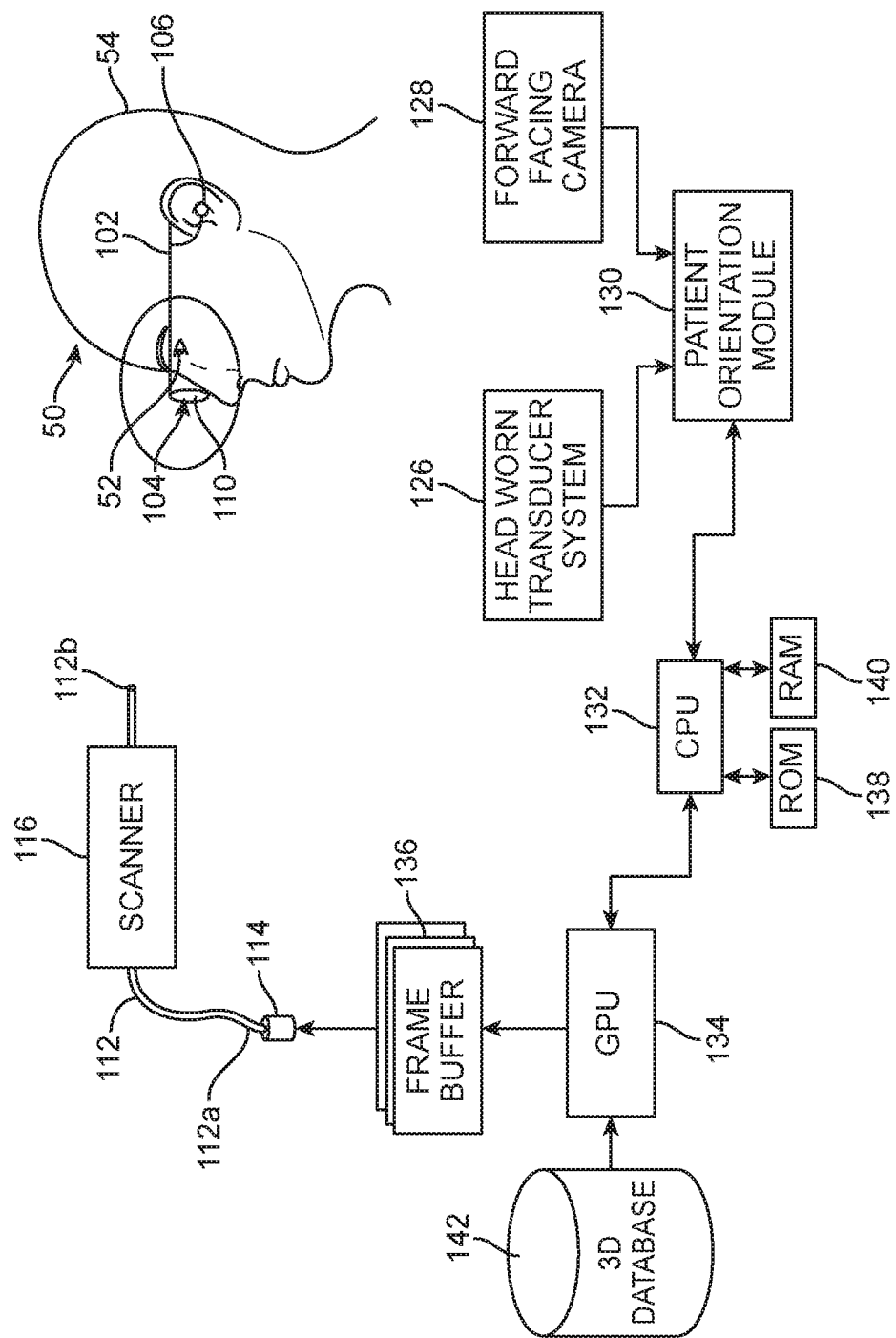
FIG. 2 is a block diagram of a virtual image generation system constructed in accordance with one embodiment of the present inventions.

Referring to FIG. 2, one embodiment of an augmented reality system 100 constructed in accordance with present inventions will now be described. The augmented reality system 100 provides images of virtual objects intermixed with physical objects in a field of view of an end user 50. The augmented reality system 100, and the various techniques taught herein, may be employed in applications other than augmented reality. For example, various techniques may be applied to any projection or display system. Or, the various techniques described herein may be applied to pico projectors where movement may be made by an end user's hand rather than the head. Thus, while often described herein in terms of an augmented reality system, the teachings should not be limited to such systems of such uses.

For the augmented reality system 100, it may be desirable to spatially position various virtual objects relative to respective physical objects in a field of view of the end user 50. Virtual objects, also referred to herein as virtual tags or tag or call outs, may take any of a large variety of forms, basically any variety of data, information, concept, or logical construct capable of being represented as an image. Non-limiting examples of virtual objects may include: a virtual text object, a virtual numeric object, a virtual alphanumeric object, a virtual tag object, a virtual field object, a virtual chart object, a virtual map object, a virtual instrumentation object, or a virtual visual representation of a physical object.

The augmented reality system 100 is capable of ensuring or at least increasing the opaqueness of virtual objects that are displayed over real objects. The augmented reality system 100 accomplishes this by decreasing the contrast between the virtual objects and the real objects in the regions where they overlap by displaying additional interference images over the real objects and/or modifying the virtual image data prior to display of the virtual objects.

To this end, the augmented reality system 100 comprises a frame structure 102 worn by an end user 50, a display system 104 carried by the frame structure 102, such that the display system 104 is positioned in front of the eyes 52 of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display system 104 is designed to present the eyes 52 of the end user 50 with photo-based radiation patterns that can be comfortably perceived as augmentations to physical reality, with high-levels of image quality and three-dimensional perception, as well as being capable of presenting two-dimensional content. The display system 104 presents a sequence of frames at high frequency that provides the perception of a single coherent scene.

In the illustrated embodiment, the display system 104 is an "optical see-through" display through which the user can directly view light from real objects via transparent (or semi-transparent) elements. The transparent element, often referred to as a "combiner," superimposes light from the display over the user's view of the real world. To this end, the display system 104 comprises a projection subsystem 108 and a partially transparent display surface 110 on which the projection subsystem 108 projects images. The display surface 110 is positioned in the end user's 50 field of view between the eyes 52 of the end user 50 and an ambient environment, such that direct light from the ambient environment is transmitted through the display surface 110 to the eyes 52 of the end user 50. In the illustrated embodiment, the projection subsystem 108 includes one or more optical fibers 112 (e.g. single mode optical fiber), each of which has one end 112a into which light is received and another end 112b from which light is provided to the partially transparent display surface 110, thereby combining with the direct light from the ambient environment, and being transmitted from the display surface 110 to the eyes 52 of the user 50. The projection subsystem 108 may also include one or more light sources 114 that produces the light (e.g., emits light of different colors in defined patterns), and communicatively couples the light to the other end 112a of the optical fiber(s) 112. The light source(s) 114 may take any of a large variety of forms, for instance, a set of RGB lasers (e.g., laser diodes capable of outputting red, green, and blue light) operable to respectively produce red, green, and blue coherent collimated light according to defined pixel patterns specified in respective frames of pixel information or data. Laser light provides high color saturation and are highly energy efficient.

Figure 3:
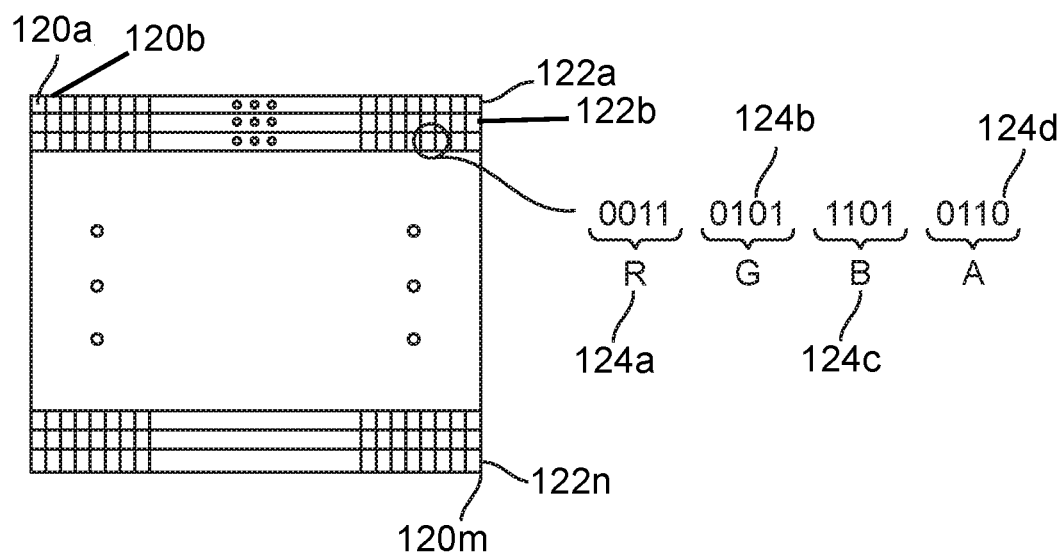
FIG. 3 is a plan view of an exemplary frame generated by the virtual image generation system of FIG. 2.

The display system 104 may further comprise a scanning device 116 that scans the optical fiber(s) 112 in a predetermined pattern in response to control signals. For example, referring to FIG. 3, a frame 118 of pixel information or data specifies pixel information or data to present an image, for example, an image of one or more virtual objects, according to one illustrated embodiment. The frame 118 is schematically illustrated with cells 120a-120m divided into horizontal rows or lines 122a-122n. Each cell 120 of the frame 118 may specify values for each of a plurality of colors for the respective pixel to which the cell 120 corresponds and/or intensities. For instance, the frame 118 may specify one or more values for red 124*a*, one or more values for green 124*b*, and one or more values for blue 124*c* for each pixel. The values 124 may be specified as binary representations for each of the colors, for instance, a respective 4-bit number for each color. Each cell 120 of the frame 118 may additionally include a value 124*d* in the form of a 4-bit number that specifies an intensity. Further details explaining an example of a display system 104 are provided in U.S. Provisional Patent Application Ser. No. 61/801,219, which is expressly incorporated herein by reference.

Referring back to FIG. 2, the augmented reality system 100 further comprises one or more sensors (not shown) mounted to the frame structure 102 for detecting the position and movement of the head 54 of the end user 50 and/or the eye position and inter-ocular distance of the end user 50. Such sensor(s) may include image capture devices (such as cameras), microphones, inertial measurement units, accelerometers, compasses, GPS units, radio devices, and/or gyros).

For example, in one embodiment, the augmented reality system 100 comprises a head worn transducer system 126 that includes one or more inertial transducers to capture inertial measurements indicative of movement of the head 54 of the end user 50. Thus, the transducer system 126 may be used to sense, measure, or collect information about the head movements of the end user 50. For instance, the transducer system 126 may be used to detect measurement movements, speeds, acceleration, and/or positions of the head 54 of the end user 50.

Significantly, the augmented reality system 100 further comprises one or more forward facing cameras 128 that are affixed relative to the head 54 of the end user 50. In one preferred embodiment, the cameras 128 are mounted to the frame structure 102. The forward facing cameras 128 may be used to capture information about the environment in which the end user 50 is located. The forward facing cameras 128 may be used to capture information indicative of distance and orientation of the end user 50 with respect to that environment and specific objects in that environment. When head worn, the forward facing cameras 128 are particularly suited to capture information indicative of distance and orientation of the head 54 of the end user 50 with respect to the environment in which the end user 50 is located and specific objects in that environment. The forward facing cameras 128 may, for example, be employed to detect head movement, speed, and/or acceleration of head movements. The forward facing cameras 128 may, for example, be employed to detect or infer a center of attention of the end user 50, for example, based at least in part on an orientation of the head 54 of the end user 50. Orientation may be detected in any direction (e.g., up/down, left, right with respect to the reference frame of the end user 50). More significantly, the forward cameras 128 capture image data of a three-dimensional scene in the ambient environment, which as will be further discussed below, can be used to determine the overlap between real objects and virtual objects from the perspective of the end user 50, and to analyze the color characteristics of the real objects in the overlap regions to facilitate reduction in the contrast between the real objects and virtual objects.

The augmented reality system 100 further comprises a patient orientation detection module 130. The patient orientation module 130 detects the instantaneous position of the head 54 of the end user 50 and predicts the position of the head 54 of the end user 50 based on position data received from the sensor(s). In one embodiment, the patient orientation module 130 predicts the position of the head 54 based on predicting the end user's 50 shift in focus. For example, the patient orientation module 130 may select a virtual object based at least on input indicative of attention of the end user 50, and determine the location of appearance of a virtual object in a field of view of the end user 50 relative to the frame of reference of the end user 50. As another example, the patient orientation module 130 may employ estimated speed and/or estimated changes in speed or estimated acceleration to predict the position of the head 54 of the end user 50. As still another example, the patient orientation module 130 may employ historical attributes of the end user 50 to predict the position of the head 54 of the end user 50. Further details describing predicting the head position of an end user 50 are set forth in U.S. Patent Application Ser. No. 61/801,219, which has previously been incorporated herein by reference.

The augmented reality system 100 further comprises a control system that may take any of a large variety of forms. The control system includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

In the illustrated embodiment, the control system of the augmented reality system 100 comprises a central processing unit (CPU) 132, a graphics processing unit (GPU) 134, and one or more frame buffers 136. The CPU 132 controls overall operation, while the GPU 134 renders frames (i.e., translating a three-dimensional scene into a two-dimensional image) from three-dimensional data stored in the remote data repository 150 and stores these frames in the frame buffer(s) 136. While not illustrated, one or more additional integrated circuits may control the reading into and/or reading out of frames from the frame buffer(s) 136 and operation of the scanning device of the display system 104. Reading into and/or out of the frame buffer(s) 146 may employ dynamic addressing, for instance, where frames are over-rendered. The augmented reality system 100 further comprises a read only memory (ROM) 138 and a random access memory (RAM) 140. The augmented reality system 100 further comprises a three-dimensional data base 142 from which the GPU 134 can access three-dimensional data of one or more scenes for rendering frames.

As will be described in further detail below, the CPU 132, based on data received from the forward facing camera(s) 128, determines overlap regions between the virtual objects rendered by the GPU 132 and the real objects, analyzes the color characteristics of the real objects in these overlap regions, and decreases the contrast between the virtual objects and the real objects in these overlap regions based the analyzed color characteristics prior to display of the virtual objects to the end user 50.

Figure 4A:
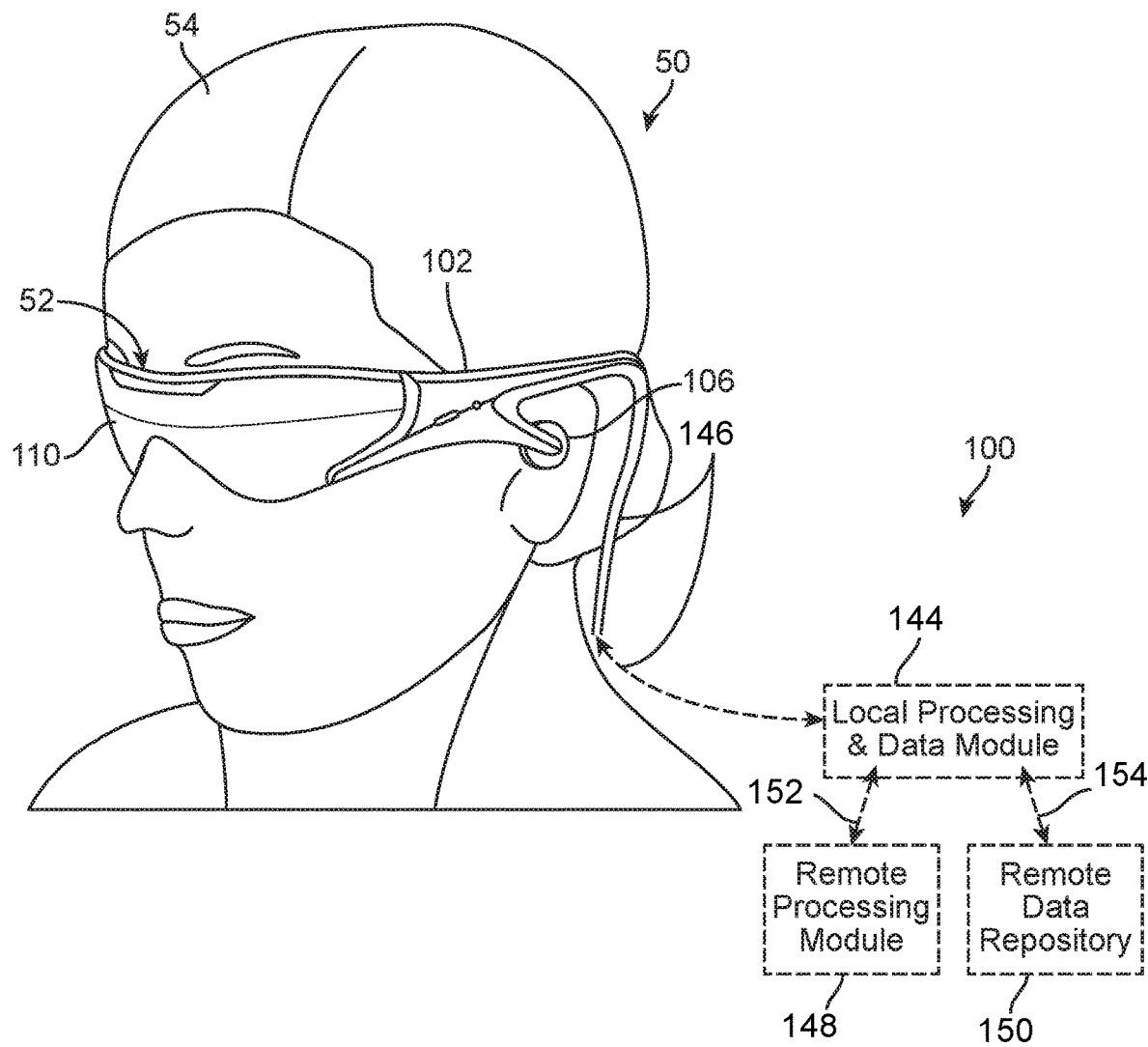
FIG. 4A is a view of one technique that can be used to wear the virtual image generation system of FIG. 2.
Figure 4B:
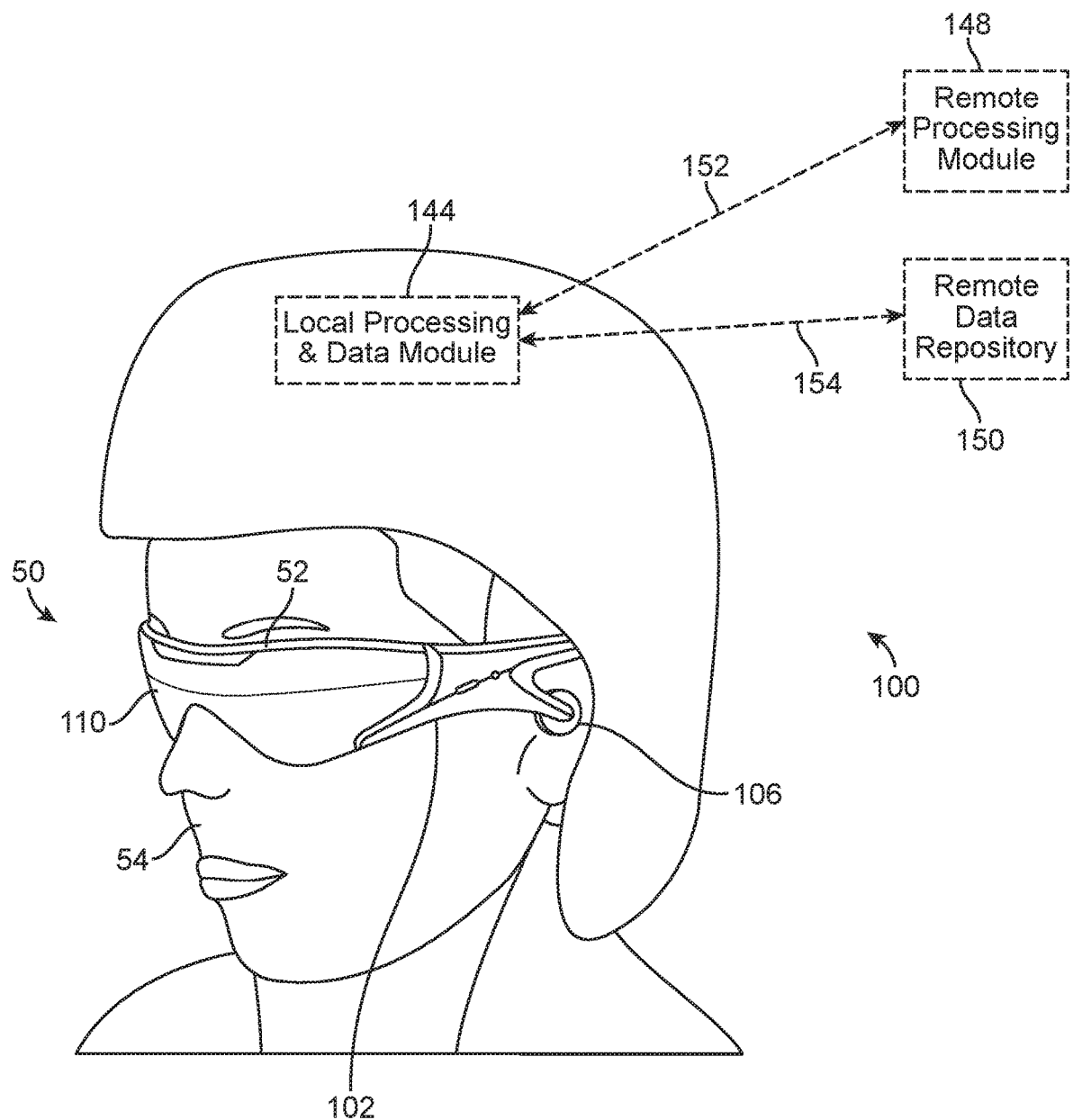
FIG. 4B is a view of another technique that can be used to wear the virtual image generation system of FIG. 2.
Figure 4C:
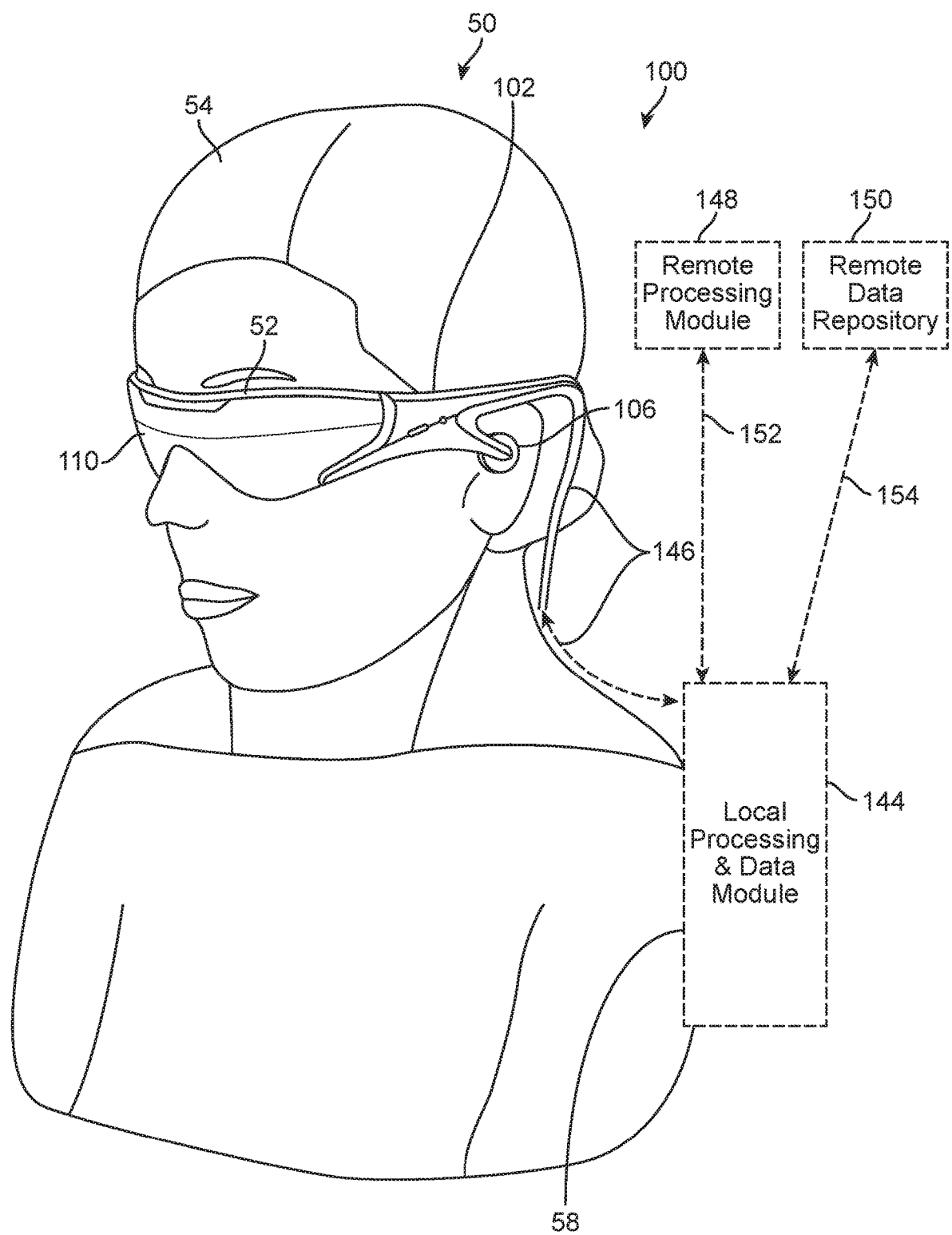
FIG. 4C is a view of still another one technique that can be used to wear the virtual image generation system of FIG. 2.
Figure 4D:
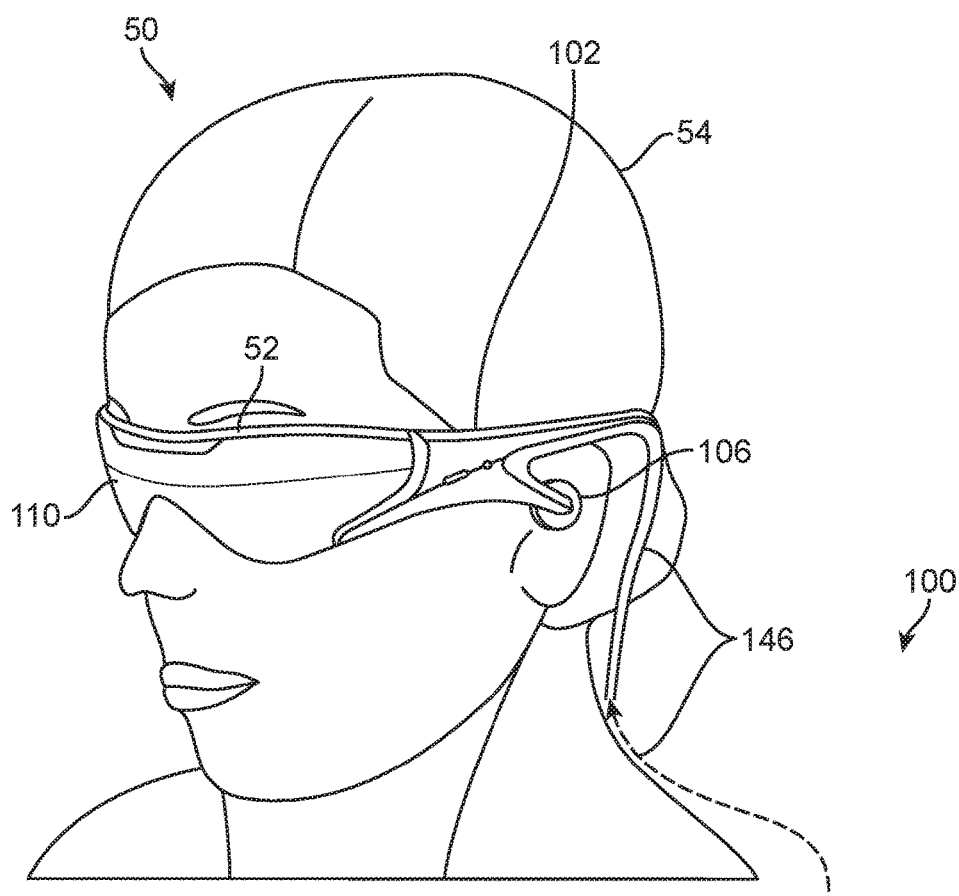
FIG. 4D is a view of yet another one technique that can be used to wear the virtual image generation system of FIG. 2.
Figure 4D:
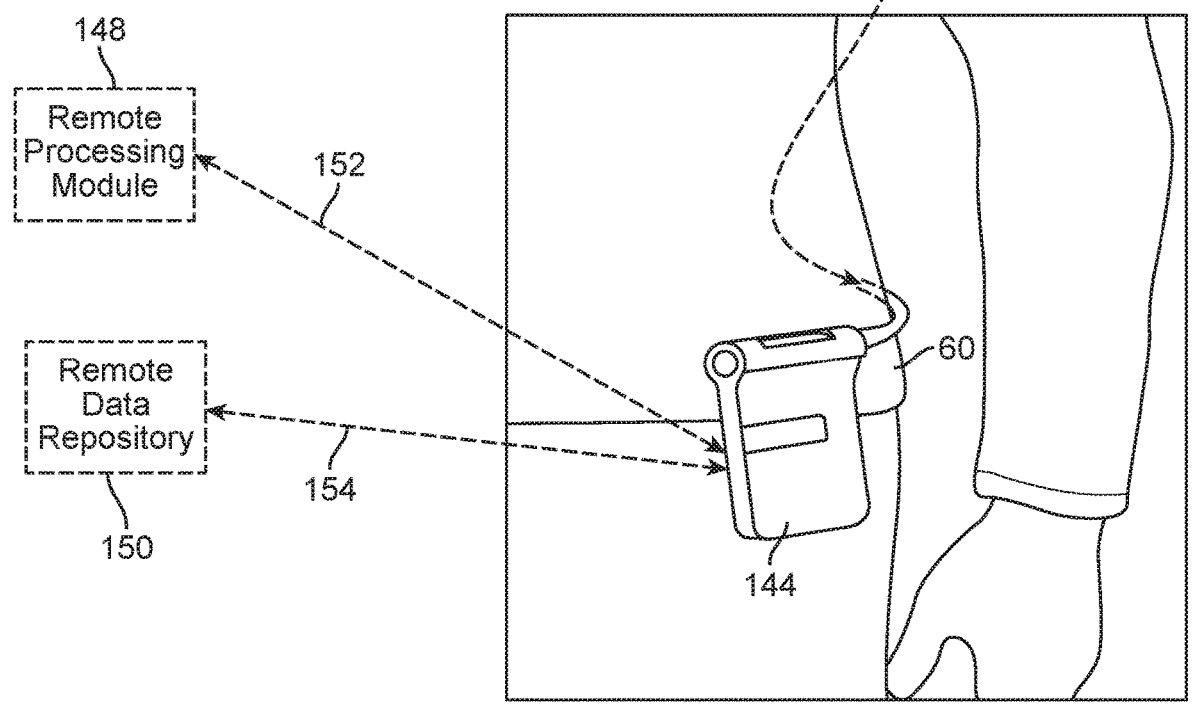

The various processing components of the augmented reality system 100 may be physically contained in a distributed system. For example, as illustrated in FIGS. 4A-4D, the augmented reality system 100 comprises a local processing and data module 144 operatively coupled, such as by a wired lead or wireless connectivity 146, to the display system 104 and sensors. The local processing and data module 144 may be mounted in a variety of configurations, such as fixedly attached to the frame structure 102 (FIG. 4A), fixedly attached to a helmet or hat 56 (FIG. 4B), embedded in headphones, removably attached to the torso 58 of the end user 50 (FIG. 4C), or removably attached to the hip 60 of the end user 50 in a belt-coupling style configuration (FIG. 4D). The augmented reality system 100 further comprises a remote processing module 148 and remote data repository 150 operatively coupled, such as by a wired lead or wireless connectivity 150, 152, to the local processing and data module 144, such that these remote modules 148, 150 are operatively coupled to each other and available as resources to the local processing and data module 144.

The local processing and data module 144 may comprise a power-efficient processor or controller, as well as digital memory, such as flash memory, both of which may be utilized to assist in the processing, caching, and storage of data captured from the sensors and/or acquired and/or processed using the remote processing module 148 and/or remote data repository 150, possibly for passage to the display system 104 after such processing or retrieval. The remote processing module 148 may comprise one or more relatively powerful processors or controllers configured to analyze and process data and/or image information. The remote data repository 150 may comprise a relatively large-scale digital data storage facility, which may be available through the internet or other networking configuration in a "cloud" resource configuration. In one embodiment, all data is stored and all computation is performed in the local processing and data module 144, allowing fully autonomous use from any remote modules.

The couplings 146, 152, 154 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 4A-4D. Thus, the particular choice of wired or wireless communications should not be considered limiting.

In the illustrated embodiment, the patient orientation module 130 is contained in the local processing and data module 144, while the CPU 132 and GPU 134 are contained in the remote processing module 148, although in alternative embodiments, the CPU 132, GPU 124, or portions thereof may be contained in the local processing and data module 144. The 3D database 142 can be associated with the remote data repository 150.

Significant to the present inventions, the augmented reality system 100 compensates for the direct light from the real world over which the virtual objects are superimposed on the display surface 110. In particular, and with reference to FIG. 5, it is noted that a first overlap region 200*a* in the display coincides with a portion of the right leg of the robot 16 and a portion of the buildings 10, and a second overlap region 200*b* in the display coincides with a portion of the left arm of the robot 16 and a portion of the sky 12. It is preferable that the right leg portion and the left arm portion of the robot 16 be opaque, such that the portions of the buildings 10 and sky 12 that are behind these robot statue portions cannot be seen by the end user 50.

Notably, the locations of the overlap regions 200*a* and 200*b* in the display depend largely on the viewing perspective of the end user 50 and any movement of the virtual objects, and in this case, the robot 16. For example, if the end user 50 moves his or her head 54 to the left, the overlap regions 200*a* and 200*b* will shift to the right in the display; if the end user 50 moves his or her head 54 to the right, the overlap regions 200*a* and 200*b* will shift to the left in the display; if the robot 16 moves to the left, the overlap regions 200*a* and 200*b* will shift to the left in the display; or if the robot 16 moves to the right, the overlap regions 200*a* and 200*b* will shift to the right in the display.

As briefly discussed above, the augmented reality system 100 compensates for the direct light from the real world by decreasing the perceived contrast (e.g., the color contrast and/or intensity contrast) between the real objects and the virtual objects in the overlap regions. For example, the augmented reality system 100 may decrease the perceived contrast between the right leg of the robot 16 and the buildings 10 in the first overlap region 200*a*, and may decrease the perceived contrast between the left arm of the robot 16 and the sky 12 in the second overlap region 200*b*. The augmented reality system 100 may decrease the perceived contrast between the real objects and the virtual objects in the overlap regions in any one of a variety of ways.

Figure 6:
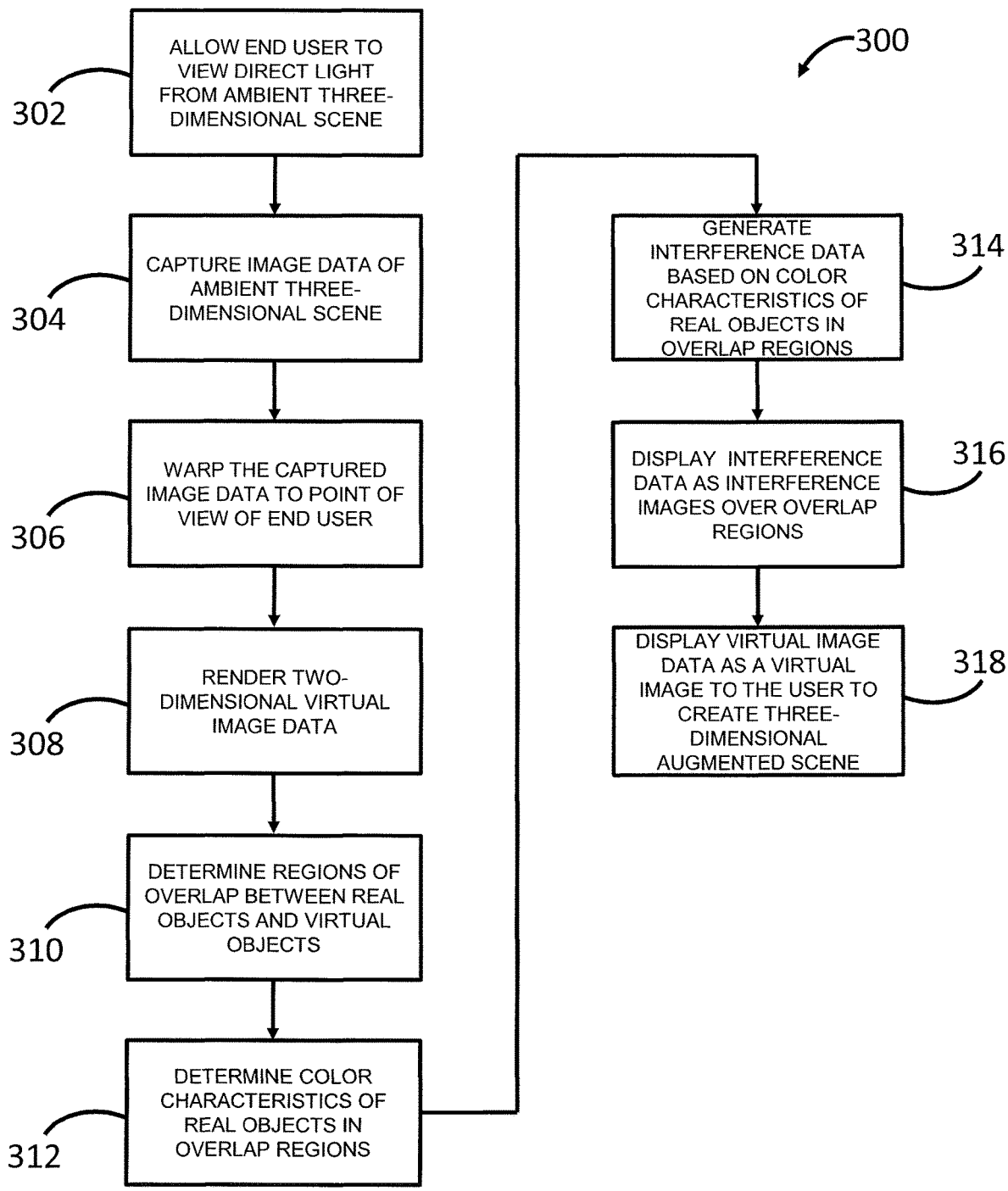
FIG. 6 is a flow diagram illustrated one method of operating the augmented reality system of FIG. 2 to increase the opaqueness of the virtual objects when displayed over real objects.

For example, referring to FIG. 6, in one method 300, the augmented reality system 100 decreases the perceived contrast between the real objects and the virtual objects in the overlap regions by displaying over the real objects in the overlap regions an interference image that is separate from the virtual image. In particular, the augmented reality system 100 allows the end user 50 to visualize direct light from the three-dimensional scene in an ambient environment, e.g., the real-world park-like setting 4 illustrated in FIG. 1 (step 302). In the illustrated embodiment, this is accomplished simply by allowing the direct light from the ambient environment to pass through the display surface 110 to the eyes 54 of the user 50. Next, the CPU 132 directs the forward facing cameras 128 to capture image data of the three-dimensional scene 4 (step 304). Notably, the forward facing cameras 128 will typically be offset from the focal points of the end user 50. For example, the forward facing cameras 128 may be affixed near the sides of the user's head 54. As such, the CPU 132 warps the captured image data to the point of view of the user 50 (step 306). In the illustrated embodiment, a two-dimensional parallax warping technique is performed on the captured image data.

Next, the CPU 132 instructs the GPU 134 to generate virtual image data from the point of the view of the end user 50, and in this embodiment, rendering the two-dimensional virtual image data from a three-dimensional virtual scene (step 308). In one embodiment, the virtual image data may be generated based on predictive head positions in order to minimize any latency issues, e.g., by rendering and warping the virtual image data in the manner described in U.S. Patent Application Ser. No. 62/308,418, entitled "Wide Baseline Stereo for Low-Latency Rendering", which is expressly incorporated herein by reference.

Then, the CPU 132 determines regions of spatial overlap between real objects in the captured image data (to obtain the real objects in the three-dimensional scene 4) and virtual objects in the virtual image data (step 310), e.g., the overlap regions 200*a* and 200*b*, with the real objects being the buildings 10 and sky 12, and the virtual objects being the right leg and left arm of the robot 16. Notably, because both the virtual image data and the captured image data (after warping) are registered in the same coordinate system (i.e., from the same point of view of the end user 50), the CPU 132 can determine the overlap regions simply by comparing the locations of the pixels of the real objects and virtual objects, and identifying the locations that are common to the real and virtual object pixels.

Next, the CPU 132 determines the color characteristics of the real objects in the captured image data in the overlap regions in order to determine the color characteristics of the corresponding real objects perceived by the end user 50 in the overlap regions) (step 312). In one embodiment, the captured image data and virtual image data comprise a plurality of pixels, each of which is defined by at least one value. For example, the captured image data and virtual image data can be formed as frames of pixel data, such as those illustrated in FIG. 3. For example, each pixel may comprise a 4-bit number for each of a red, green, and blue color, and may further comprise a 4-bit number for intensity. In this case, the CPU 132 determines the color characteristics of the corresponding real objects in the captured image data by determining the color and/or intensity values of each of the pixels in the overlap regions.

Next, the CPU 132 decreases the perceived contrast (e.g., the perceived color contrast and/or perceived color intensity) between the real objects and the virtual objects in the overlap regions based on the determined color characteristics of the respective real objects in the overlap regions. In particular, the CPU 132 generates interference data based on the determined color characteristics of the real objects in the overlap regions (step 314), and instructs the display system 104 to display the interference data as an interference image over the overlap regions to the end user 50, such that the interference image combines with the direct light from the real objects to create a background for the virtual objects in the overlap regions (step 316).

In one embodiment, the backgrounds in the overlap regions have decreased dynamic color ranges relative to the real objects in the overlap regions; e.g., the backgrounds may have a generally uniform color, such as grey, in the overlap regions. For example, assume that the color of the real object in the overlap region 200a, and in this case the color of the buildings 10, varies from a brownish color to a greenish color amongst the pixels, such that the buildings 10 have a relatively high dynamic color range in the overlap region 200a. The CPU 132 may decrease the perceived dynamic color range in the overlap region 200a by adding color to the buildings 10 on a pixel-by-pixel basis, such that the buildings 10 have a uniform grey color in the overlap region 200a. For example, if it is desired for each of the pixels in the background to have a color vector that defines a uniform greyish hue, and a first pixel of the buildings 10 in the overlap region 200a has a color vector that defines a yellowish hue, and a second pixel of the buildings 10 in the overlap region 200a has a color vector that defines a greenish hue, the CPU 132 may select a greyish hue for the background that has a color vector having values that are all greater than the respective values of the color vectors of the pixels of the buildings 10 for the background, and generate interference data that adds color to the pixels of the buildings 10, such that the background is the selected greyish hue.

For example, if the first pixel of the buildings 10 has a color vector of [167, 100, 67] (i.e., the 4-bit binary value for the red, green, and blue respectively equals 167, 100, 67), the second pixel of the buildings 10 has a color vector of [39, 122, 62] (i.e., the 4-bit binary value for the red, green, and blue respectively equals 39, 122, 62), and the selected color vector for the background is [168, 168, 168] (i.e., the 4-bit binary value for each of the red, green, and blue equals 128), the CPU 132 may generate a first interference pixel having a color vector of [1, 68, 101] and a second interference pixel having a color vector of [129, 46, 106], which when added to the respective first and second pixels of the buildings 10 will equal [168, 168, 168]. Thus, when the interference image is displayed over the overlap regions 200a and 200b, the first and second pixels of the interference image will combine with the corresponding first and second pixels of the buildings 10 to create a greyish background color for the corresponding first and second pixels of the virtual object (i.e., the right leg of the robot 16). Notably, although only two pixels are illustrated and described with respect to the overlap region 200a for purposes of brevity and illustration, the number of pixels in any particular overlap region will typically far exceed two, and thus, the number of interference pixels needs to be generated will likewise far exceed two.

The CPU 132 may also add intensity to the real objects in the overlap regions to match the intensity of the virtual objects in the overlap regions. For example, if the first pixel of the buildings 12 has an intensity value of 128, and the corresponding pixel value of the right leg of the robot 16 has an intensity value of 168, the CPU 132 may generate the first interference pixel with an intensity value of 40, which when combined with the intensity value of the first pixel of the buildings 12, creates a background pixel value of 168.

Lastly, the CPU 132 instructs the display system 104 to display the virtual image data as a virtual image to the end user 50 after the perceived contrast between the real objects and the virtual objects have been decreased that, along with the visualized direct light, creates a three-dimensional augmented scene (step 318). For example, if the perceived color of the buildings 10 in the overlap region 200a are a uniform grey (after compensation using the interference image), the right leg of the robot 16 will presumably be opaque when displayed over the buildings 10 in the overlap region 200a. Notably, the virtual image may be simultaneously displayed with the interference image, in which case, different optical fibers 112 may be respectively used to display the virtual image and interference image; or the virtual image may be displayed very soon after the interference image is displayed, in which case, the same optical fiber 112 may be used to sequentially display the virtual image and interference image at time that are spaced close enough together, such that the end user 50 simultaneously perceives the virtual image and interference image.

Figure 7:
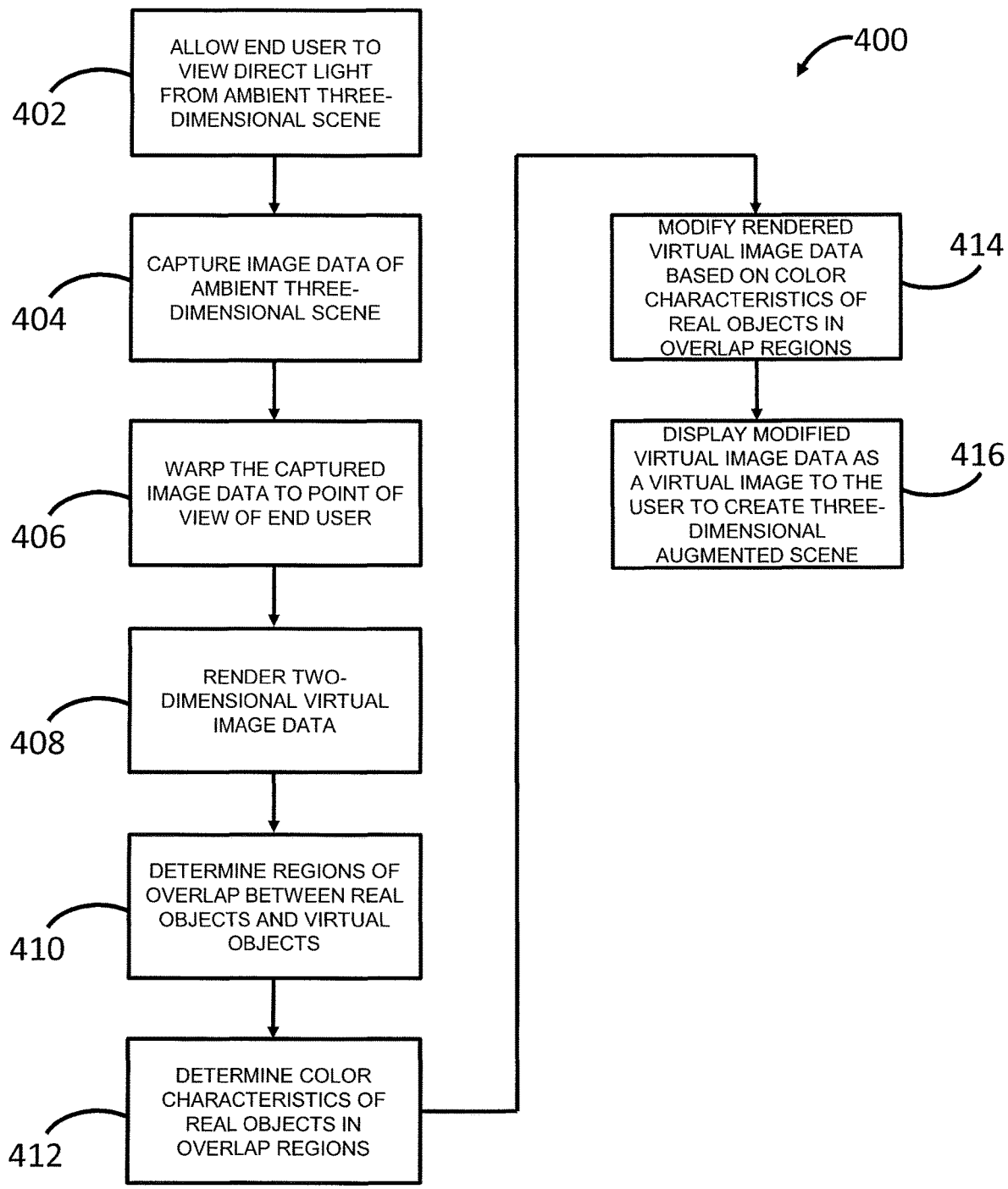
FIG. 7 is a flow diagram illustrated another method of operating the augmented reality system of FIG. 2 to increase the opaqueness of the virtual objects when displayed over real objects.

As another example, and reference to FIG. 7, in one method 400, the augmented reality system 100 may alternatively decrease the perceived contrast between the real objects and the virtual objects in the overlap regions by modifying the virtual objects in the overlap regions.

Figure 1:
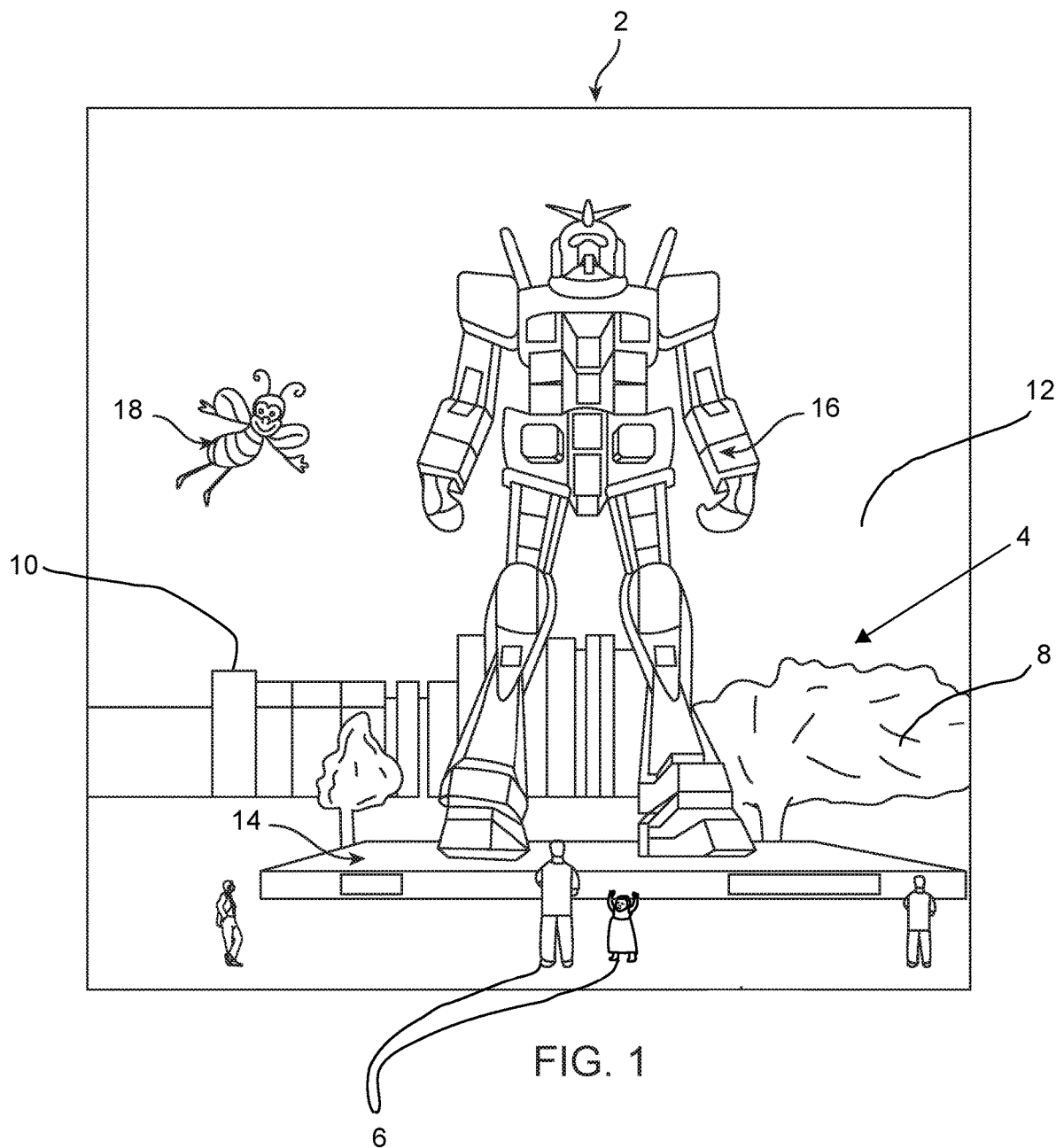
FIG. 1 is a picture of a three-dimensional augmented reality scene that can be displayed to an end user by a prior art augmented reality generation device.

In particular, in the same manner described above with respect to steps 402-412, the augmented reality system 100 allows the end user 50 to visualize direct light from the three-dimensional scene in an ambient environment, e.g., the real-world park-like setting 4 illustrated in FIG. 1 (step 402), directs the forward facing cameras 128 to capture image data of the three-dimensional scene 4 (step 404), warps the captured image data to the point of view of the user 50 (step 406), instructs the GPU 134 to generate virtual image data from the point of the view of the end user 50 (step 408), determines regions of spatial overlap between real objects in the captured image data (to obtain the real objects in the three-dimensional scene 4) and virtual objects in the virtual image data (step 410), and determines the color characteristics of the real objects in the captured image data in the overlap regions (to determine the color characteristics of the corresponding real objects in the overlap regions) (step 412).

Similar to the technique illustrated in FIG. 6, the CPU 132 next decreases the perceived contrast (e.g., the perceived color contrast and/or perceived color intensity) between the real objects and the virtual objects in the overlap regions based on the determined color characteristics of the respective real objects in the overlap regions. However, in this case, instead of generating interference data, the CPU 132 modifies the virtual image data based on the determined color characteristics of the real objects in the overlap regions (step 414).

In one embodiment, the CPU 132 modifies the virtual image data such that all color is removed from the perceived real objects in the overlap regions. In this case, color may be subtracted from the original virtual image data, which subtracted color is used to make the real objects black in the overlap regions. To this end, the color vectors of the pixels of the real objects in the overlap regions may be subtracted from color vectors of the corresponding pixels of the virtual objects in the overlap regions to obtain the color vectors of the pixels for the modified virtual image data to be used for the virtual objects. In other words, combining the pixels of the modified virtual objects with the corresponding pixels of the real objects will yield the original virtual objects.

For example, assuming that a first pixel of the buildings 10 in the overlap region 200 has a color vector of [167, 100, 67] (i.e., the 4-bit binary value for the red, green, and blue respectively equals 167, 100, 67), a second pixel of the buildings 10 has a color vector of [39, 122, 62] (i.e., the 4-bit binary value for the red, green, and blue respectively equals 39, 122, 62), a corresponding first pixel of the right leg of the robot 16 has a color vector of [185, 123, 80] (i.e., the 4-bit binary value for the red, green, and blue respectively equals 185, 123, 80), and a corresponding second pixel of the right leg of the robot 16 has a color vector of [65, 140, 80] (i.e., the 4-bit binary value for the red, green, and blue respectively equals 65, 140, 80), the CPU 132 may modify the first and second pixels of the right leg of the robot 16 to have color vectors [18, 23, 13] and [26, 18, 18]. Thus, combining the color vectors of the first and second pixels of the modified virtual objects with the color vectors of the corresponding first and second pixels of the real objects yield the color vectors of the first and second pixels of the original virtual objects. That is, for the first pixel, [18, 23, 13]+[167, 100, 67]=[185, 123, 80], and for the second pixel, [26, 18, 18]+[39, 122, 62]=[65, 140, 80].

Figure 5:
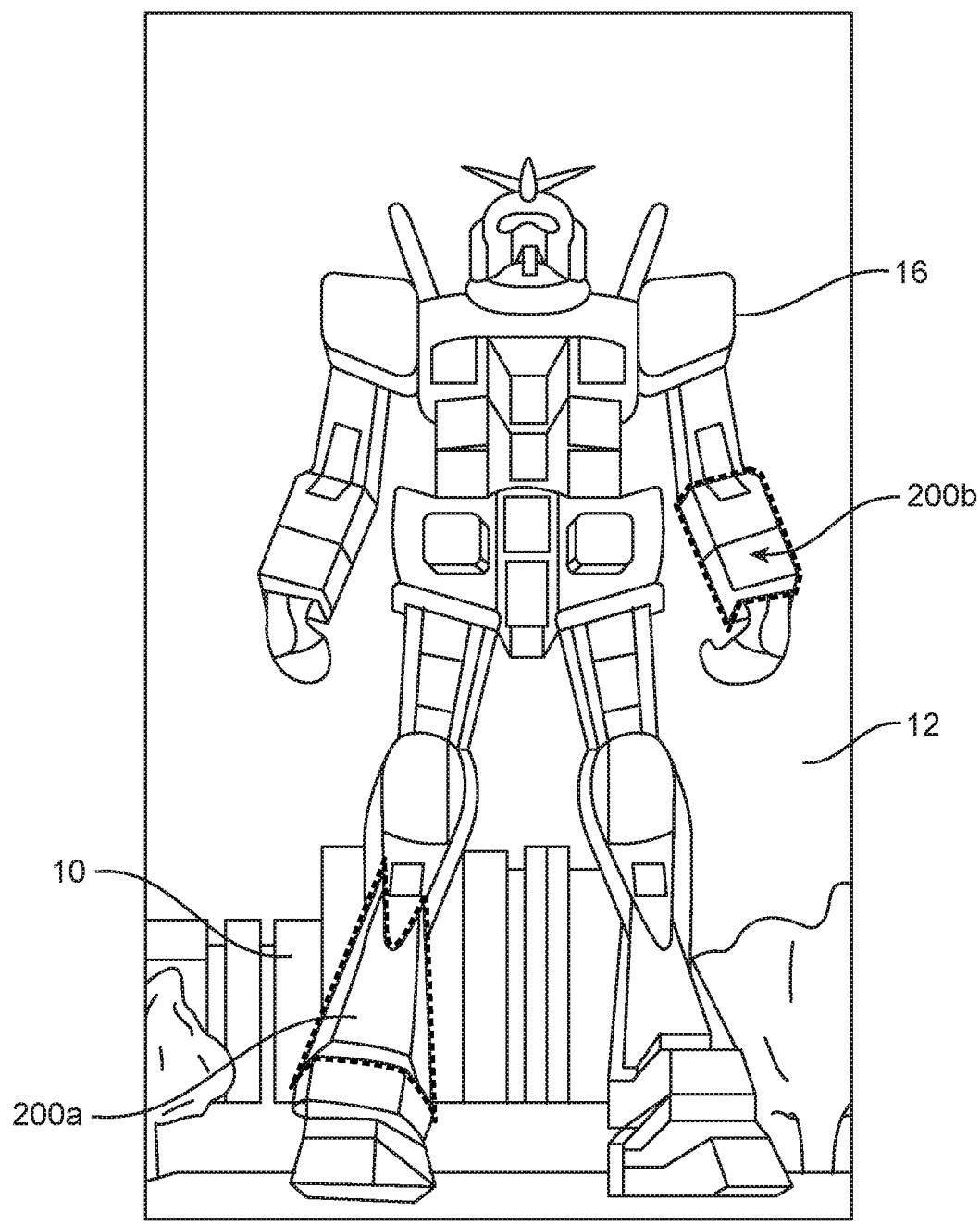
FIG. 5 is a picture of a three-dimensional augmented reality scene that can be displayed to an end user by the augmented reality system of FIG. 2, wherein overlap regions between real objects and virtual objects are particularly noted.

Lastly, in the same manner in the technique illustrated in FIG. 5, the CPU 132 instructs the display system 104 to display the virtual image data as a virtual image to the end user 50 after the perceived contrast between the real objects and the virtual objects have been decreased that, along with the visualized direct light, creates a three-dimensional augmented scene (step 416).

Figure 8:
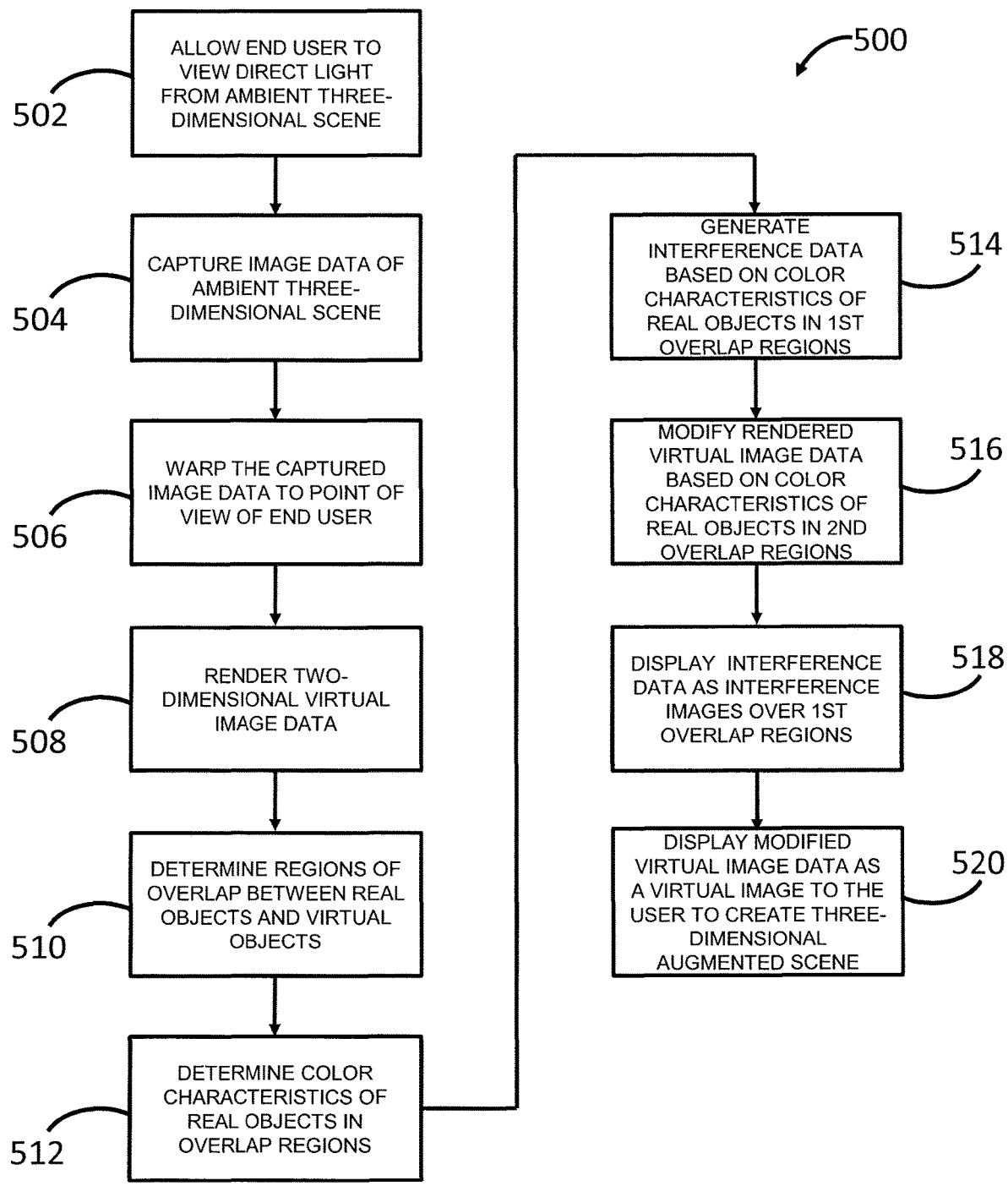
FIG. 8 is a flow diagram illustrated another method of operating the augmented reality system of FIG. 2 to increase the opaqueness of the virtual objects when displayed over real objects.

As still another example, and reference to FIG. 8, in one method 500, the augmented reality system 100 may alternatively decrease the perceived contrast between the real objects and the virtual objects in the overlap regions by both displaying an interference image over the real objects in the overlap regions and modifying the virtual objects in the overlap regions.

In particular, in the same manner described above with respect to steps 302-312, the augmented reality system 100 allows the end user 50 to visualize direct light from the three-dimensional scene in an ambient environment, e.g., the real-world park-like setting 4 illustrated in FIG. 1 (step 502), directs the forward facing cameras 128 to capture image data of the three-dimensional scene 4 (step 504), warps the captured image data to the point of view of the user 50 (step 506), instructs the GPU 134 to generate virtual image data from the point of the view of the end user 50 (step 508), determines regions of spatial overlap between real objects in the captured image data (to obtain the real objects in the three-dimensional scene 4) and virtual objects in the virtual image data (step 510), and determines the color characteristics of the real objects in the captured image data in the overlap regions (to determine the color characteristics of the corresponding real objects in the overlap regions) (step 512).

Similar to the technique illustrated in FIGS. 6 and 7, the CPU 132 next decreases the perceived contrast (e.g., the perceived color contrast and/or perceived color intensity) between the real objects and the virtual objects in the overlap regions based on the determined color characteristics of the respective real objects in the overlap regions. However, in this case, the CPU 132 will generate interference data for a first set of the overlap regions or portions thereof (step 512), and will modify the virtual image data for a second different set of the overlap regions or portions thereof (step 514). For example, for those portions of the overlap regions where displaying an interference image over real object will potentially decrease the contrast between that real object and the virtual object (i.e., adding color to the real object will decrease the perceived contrast), the CPU 132 will generate interference data, and for those portions of the overlap regions where displaying an interference image over the real object will not potentially decrease the contrast between that real object and the virtual object (i.e., adding color to the real object will increase the perceived contrast), the CPU 132 will modify the virtual image data instead of generating interference data.

For example, assume that the first pixel of the buildings 10 has a color vector of [167, 100, 67] (i.e., the 4-bit binary value for the red, green, and blue is respectively 167, 100, 67), the second pixel of the buildings 10 has a color vector of [185, 125, 139] (i.e., the 4-bit binary value for the red, green, and blue is respectively 185, 125, 139), a corresponding first pixel of the right leg of the robot 16 has a color vector of [185, 123, 80] (i.e., the 4-bit binary value for the red, green, and blue is respectively 185, 123, 80), a corresponding second pixel of the right leg of the robot 16 has a color vector of [39, 122, 62] (i.e., the 4-bit binary value for the red, green, and blue is respectively 39, 122, 62), and the selected color vector for the background is [168, 168, 168] (i.e., the 4-bit binary value for each of the red, green, and blue is 128).

The CPU 132 may determine that color can be added to the first pixel of the buildings 10 to obtain the selected background. That is, all of the values in the color vector for the first pixel of the buildings 10 are below the values of the selected background color vector. Thus, the CPU 132 may generate a first interference pixel having a color vector of [1, 68,101], which when added to the first pixel of the buildings 10, will equal [168, 168, 168]. In contrast, the CPU 132 may determine that color cannot be added to the second pixel of the buildings 10 to obtain the selected background. That is, at least one of the values in the color vector for the second pixel is not below the corresponding value(s) of the selected background color vector. Thus, instead of generating interference data, the CPU 132 may modify the second pixel of the right leg of the robot 16 to have a color vector [26, 18, 18]. Thus, combining the color vector of the second pixel of the modified virtual object with the color vector of the corresponding second pixel of the real object yields the color vector of the second pixel of the original virtual object. That is, for the second pixel, [26, 18, 18]+[39, 122, 62]=[65, 140, 80].

Lastly, in the same manner in the technique illustrated in FIG. 6, the CPU 132 instructs the display system 104 to display the interference data as an interference image over the first set of overlap regions or portions thereof to the end user 50, such that the interference image combines with the direct light from the real objects to create a background for the virtual objects in the first set of overlap regions or portions thereof (step 518), and instructs the display system 104 to display the virtual image data as a virtual image to the end user 50 after the perceived contrast between the real objects and the virtual objects have been decreased that, along with the visualized direct light, creates a three-dimensional augmented scene (step 520). Notably, the unmodified virtual image data will be displayed over the first set of overlap regions or portions thereof (i.e., the portions over which the interference image is displayed), and the modified virtual image data will be displayed over the second set of overlap regions or portions thereof (i.e., the portions over which the interference image is not displayed).

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method of operating an augmented reality (AR) system, the method comprising:
    allowing an end user to visualize direct light from a three-dimensional scene in an ambient environment;
    capturing image data of the real three-dimensional scene with at least one camera affixed relative to a head of a user;
    generating virtual image data from the point of the view of the end user, wherein each of the image data captured with the at least one camera and the virtual image data comprises a plurality of pixels, each pixel of which is defined by at least one value;
    determining an overlap region of a spatial overlap between a real object in the three-dimensional scene and a virtual object in the virtual image data, wherein determining the overlap region between the real object and the virtual object comprising:
        determining the spatial overlap between a corresponding real object in the image data and the virtual object in the virtual image data;
    determining a color of the real object in the overlap region at least by determining a corresponding color of the corresponding real object in the image data for the overlap region;
    displaying the virtual image data as a virtual image to the end user that, along with the visualized direct light, creates a three-dimensional augmented scene; and
    completely obscuring the real object in the overlap region from the perspective of the end user based on the color of the real object in the overlap region, wherein
        completely obscuring the real object in the overlap region comprises modifying the at least one value of a pixel of the virtual object in the overlap region,
        modifying the at least one value of the pixel of the virtual object in the overlap region comprises reducing the at least one value of the pixel of the virtual object, and
        the at least one value of the pixel of the virtual object is reduced by at least one corresponding value of a corresponding pixel of the corresponding real object.

2. The method of claim 1, wherein completely obscuring the real object in the overlap region comprises:
    generating interference data based on the color of the real object in the overlap region; and
    displaying the interference data as an interference image over the overlap region to the user such that the interference image combines with the direct light from the real object to create a background for the virtual object in the overlap region.

3. The method of claim 2, wherein the background in the overlap region has a decreased dynamic color range relative to the real object in the overlap region.

4. The method of claim 3, wherein the background has a generally uniform color in the overlap region.

5. The method of claim 4, wherein the generally uniform color is grey.

6. The method of claim 2, wherein the interference image adds a first color to the real object in the overlap region.

7. The method of claim 1, wherein completely obscuring the real object in the overlap region comprises modifying the virtual image data based on the color of the real object in the overlap region.

8. The method of claim 7, wherein the modifying the virtual image data comprises subtracting the color from the virtual object in the overlap region.

9. The method of claim 1, wherein the each of the plurality of pixels has three values defining a color vector.

10. The method of claim 9, wherein the color vector comprises a red value, a green value, and a blue value.

11. The method of claim 1, wherein the at least one value of the pixel of the virtual object has three first values defining a first color vector, and the at least one value of the corresponding pixel of the real object has three second values defining a second color vector.

12. The method of claim 1, wherein
    completely obscuring the real object in the overlap region comprises:
        selecting at least one background value of a background pixel of a background for the virtual object in the overlap region;
        generating interference data comprising a first plurality of pixels, each of which is defined by at least one second value, and
        displaying the interference data as an interference image over the overlap region to the user such that the interference image combines with the direct light from the real object to create the background for the virtual object in the overlap region.

13. The method of claim 12, wherein the each of the first plurality of pixels has three values defining a color vector.

14. The method of claim 12, wherein the color vector comprises a red value, a green value, and a blue value.

15. The method of claim 12, wherein completely obscuring the real object in the overlap region further comprises selecting at least one background value of a background pixel of the background for the virtual object in the overlap region, wherein at least one interference value of a first corresponding pixel of the interference data, when respectively added to the at least one corresponding value of the corresponding pixel of the corresponding real object in the image data in the overlap region, equals the at least one background value of the background pixel of the background for the virtual object in the overlap region.

16. The method of claim 12, wherein all of corresponding values for corresponding pixels of the corresponding real object in the image data for the overlap region are respectively below the at least one background value of the background pixel of the background for the virtual object in the overlap region.

17. The method of claim 16, wherein completely obscuring the real object in the overlap region further comprises:
- determining that at least one first corresponding value for another corresponding pixel of the corresponding real object in the image data in the overlap region is below at least one first background value of another corresponding background pixel of the background for the virtual object in the overlap region; and
- modifying the at least one value of another corresponding pixel of the virtual object in the overlap region.

* * * * *